United States Patent
Da Graca et al.

(10) Patent No.: US 7,983,642 B2
(45) Date of Patent: Jul. 19, 2011

(54) METHOD AND SYSTEM FOR DETECTING AN OUT OF BAND INTERFERER IN AN RF RECEIVER

(75) Inventors: Paul J. Da Graca, Somerset, NJ (US); Alfred R. Mangino, Somerset, NJ (US); Richard S. Camden, Deerfield Beach, FL (US)

(73) Assignee: Analog Devices, Inc., Norwood, MA (US)

( * ) Notice: Subject to any disclaimer, the term of this patent is extended or adjusted under 35 U.S.C. 154(b) by 681 days.

(21) Appl. No.: 12/059,807

(22) Filed: Mar. 31, 2008

(65) Prior Publication Data

US 2009/0247106 A1  Oct. 1, 2009

(51) Int. Cl.
*H04B 1/06* (2006.01)
(52) U.S. Cl. ............... 455/240.1; 455/241.1; 455/232.1
(58) Field of Classification Search ............. 455/240.1, 455/251.1, 232.1, 234.1, 234.2, 245.1, 245.2, 455/247.1, 250.1, 253.1, 254–260, 339–341, 455/226.1, 230, 241.1, 1; 375/345
See application file for complete search history.

(56) References Cited

U.S. PATENT DOCUMENTS

| | | | |
|---|---|---|---|
| 6,442,380 B1 * | 8/2002 | Mohindra | 455/234.1 |
| 6,571,083 B1 * | 5/2003 | Powell et al. | 455/69 |
| 6,980,786 B1 * | 12/2005 | Groe | 455/314 |
| 7,200,372 B2 * | 4/2007 | Carpineto et al. | 455/130 |
| 7,570,934 B2 * | 8/2009 | Shalash | 455/240.1 |
| 2002/0142745 A1 * | 10/2002 | Kang et al. | 455/232.1 |
| 2003/0064692 A1 * | 4/2003 | Shi | 455/232.1 |
| 2004/0048592 A1 * | 3/2004 | Yamanaka | 455/234.1 |
| 2004/0152432 A1 * | 8/2004 | Gu | 455/136 |
| 2004/0229586 A1 * | 11/2004 | Oshima et al. | 455/240.1 |
| 2005/0026583 A1 | 2/2005 | Carpineto et al. | |
| 2005/0047533 A1 * | 3/2005 | Ruelke et al. | 375/345 |
| 2006/0178165 A1 * | 8/2006 | Vassiliou et al. | 455/552.1 |
| 2007/0243843 A1 | 10/2007 | Shalash | |

OTHER PUBLICATIONS

PCT International Search Report and Written Opinion mailed on May 20, 2009, for PCT/US2009/037540.

* cited by examiner

*Primary Examiner* — Pablo N Tran
(74) *Attorney, Agent, or Firm* — Kenyon & Kenyon LLP

(57) ABSTRACT

A system and method is provided for reducing signal distortion and saturation within an RF receiver which may be operated in an environment under the presence of interfering signals such as in a WiMAX environment. In an embodiment, a first gain stage and a second gain stage are selectively lowered to predetermined lower levels, assuring that if there is a blocker present, it would not cause signal distortion and saturation in the receiver. The loss of the gain in the first gain stage and second gain stage is compensated by a third gain stage which selectively amplifies the signals of interest. If a blocker is not detected, the maximum allowable gain of the first gain stage and the second gain stage is set to a predetermined upper limit allowing for maximum receiver sensitivity. Accordingly, with this system and method a direct conversional receiver can operate in the presence of interfering signals without signal distortion and saturation.

13 Claims, 3 Drawing Sheets

METHOD AND SYSTEM FOR DETECTING AN OUT OF BAND INTERFERER IN AN RF RECEIVER

COPYRIGHT AND LEGAL NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND INFORMATION

The present invention relates to communications technology and more particularly to radio frequency (RF) receiver systems and the methods of such receivers.

An RF receiver is an electronic circuit that enables a particular radio signal to be separated from all others being received and converted into a format suitable for further processing. In an RF receiver unwanted frequency products can exist with wanted signals at the receiver inputs. For instance, it may be desired for an RF receiver to operate in an environment with interferers, one example may be the Worldwide Interoperability for Microwave Access (WiMAX) signal, which is used, among other applications, in connecting WiFi hotspots with each other and to other parts of the internet. These unwanted signals are known as interferers or block signals. If these out of band signals are not eliminated or attenuated, signal distortion and saturation within the receiver may result.

Thus, there is a need for a system and method for reducing signal distortion and saturation within an RF receiver.

BRIEF DESCRIPTION OF THE DRAWINGS

The invention is illustrated in the figures of the accompanying drawings, which are meant to be exemplary and not limiting, and in which like references are intended to refer to like or corresponding parts.

DETAILED DESCRIPTION

Figure 1:
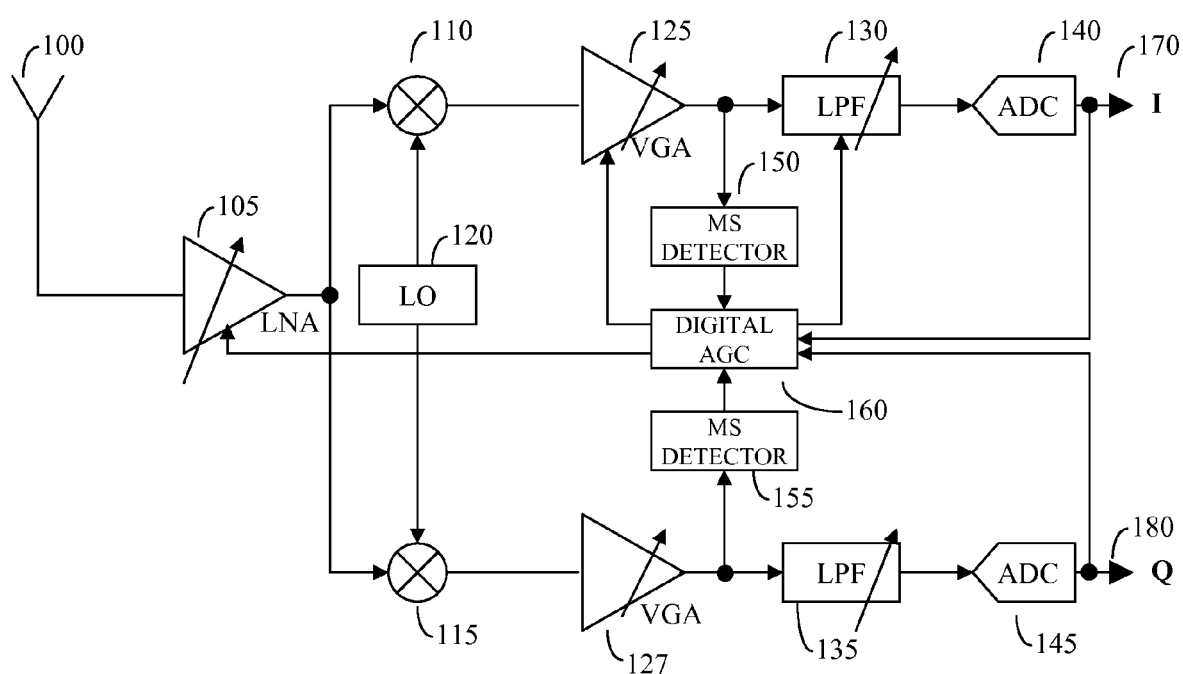
FIG. 1 shows a direct conversional receiver architecture such as may be used in an embodiment of the invention.

A system and method is provided for reducing signal distortion and saturation within an RF receiver. FIG. 1 depicts a direct conversional receiver architecture such as may be used in an embodiment of the invention. Such architecture may comprise an input antenna 100, a low noise amplifier (LNA) 105, at least one mixing node 110 and 115, at least one variable gain amplifier (VGA) 125 and 127, at least one mean square detector (MS Detector) 150 and 155, at least one low pass filter with variable gain stage (LPF) 130 and 135, at least one analog to digital converter (ADC) 140 and 145, a digital automatic gain control circuit (AGC) 160, and a local oscillator (LO) 120.

External signals, which may include in-band and out of band signals, are received by input antenna 100 and coupled to the input of an LNA 105 which has an adjustable gain. The gain of LNA 105 may be adjustable by an output signal of the AGC 160. The outputs of the LNA 105 and the LO 120 are supplied to mixer 110 which provides a conversion of the RF signal to the base band. Mixer 115 provides a similar purpose except that it is 90° out of phase with mixer 110. A variable gain amplifier 125 receives the output of the mixer 110 signal and the output of the AGC 160. Here, the gain allowable is increased or decreased, depending on the output of the AGC 160. The analog MS Detector 150 detects the power of the output of VGA 125. This output represents the combined gain of the LNA 105 and VGA 125. In one embodiment, the LNA 105 power may range from a minimum −9 dB to 21 dB. The VGA 125 power may range from 3 dB to 30 dB. Thus, the combined gain of LNA 105 and VGA 125 may be from −6 dB to 51 dB. Based upon the power level at the output of VGA 125, the analog MS Detector 150 passes a signal to the AGC 160, which is indicative of the combined power level of the LNA 105 and VGA 125.

Figure 3:
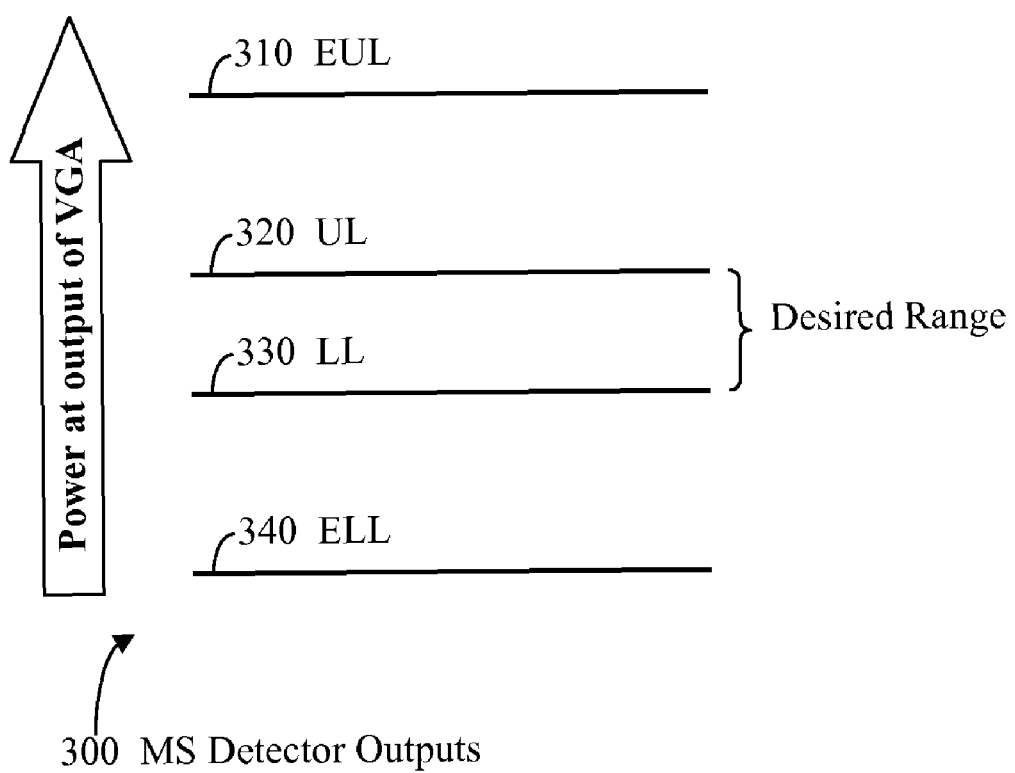
FIG. 3 depicts different regions of an MS Detector output in accordance with an embodiment of the invention.

FIG. 3 depicts an embodiment of the different output signals of the MS Detectors 150 and 155. The output signals may indicate the operation of the LNA 105 and VGA 125 in an extended upper level (EUL) 310, an upper level (UL) 320, a lower level (LL) 330, and an extended lower level (ELL) 340. The EUL 310 represents the highest combined power output level of the LNA 105 and VGA 125 with respect to UL 320, LL 330, and EUL 340. It may be indicative that the combined output power of the LNA 105 and VGA 125 is too strong. MS Detector 150 output level UL indicates a combined output power of the LNA 105 and VGA 125 to be lower than EUL 310 but higher than LL 330. MS Detector 150 output level LL 330 indicates a combined output power output of the LNA 105 and VGA 125 to be lower than UL 320 but higher than ELL 340. The ELL 340 represents the lowest output power level of the LNA 105 and VGA 125 which may indicate that the power is too weak. Both the UL 320 and LL 330 indicate desired output power levels. In one embodiment, MS Detector 150 could use two bits to represent the combined output power level of the LNA 105 and VGA 125. For example, 11=EUL 310 (signal is too strong), 10=UL 320 (signal is strong), 01=LL 330 (signal is good), and 00=ELL 340 (signal is too weak).

Referring back to FIG. 1, the LPF 130 receives the output signal of VGA 125 and filters out undesired signals. In addition, the LPF 130 has a gain component that can increase, decrease, or leave the gain the same for the filtered signal. Next, the filtered signal at the output of LPF 130 is processed by an analog to digital converter ADC 140. The digital output of ADC 140 is representative of sampled data 1170.

The parallel path from LNA 105 through mixer 115, VGA 127, MS Detector 155, LPF 134, and ADC 145, provides substantially the same functionality as the path of mixer 110, VGA 125, MS Detector 150, LPF 135, and ADC 140 as described above, except that it is 90° out of phase. For instance, in an embodiment, mixer 110 may be a sine mixer while mixer 115 may be a cosine mixer. Thus, output Q 180 is 90° out of phase with output 1170.

In an embodiment of the present invention, the digital AGC 160 monitors an indication of the combined gain of the LNA 105 and VGA 125 through the output of the MS Detector 150. In addition, an indication of the gain of the LPF 130 is monitored from the output of the ADC 140. Complete input signal strength detection is enabled by monitoring an indication of the combined gain of the LNA 105 and VGA 127 through the output of MS Detector 155 and by monitoring an indication of the gain of the LPF 135 from the output of the ADC 145. Based on these inputs and since AGC 160 tries to keep the power at the output of the VGA 125 within the desired range, as shown in FIG. 3, AGC 160 may set the gains of the system to the maximum allowable gain for the LNA 105 and the maximum allowable gain for VGA 125 accordingly. The LPF 130 gain can also be set by the AGC 160 to amplify the in-band signal to keep its output within its own desired range. By dynamically controlling the maximum and minimum allowable gains setting under the presence or blockers or interferers, the effect of the blocking signal can be minimized or eliminated. The methodology for the maximum and minimum allowable gain settings is described below.

Figure 2:
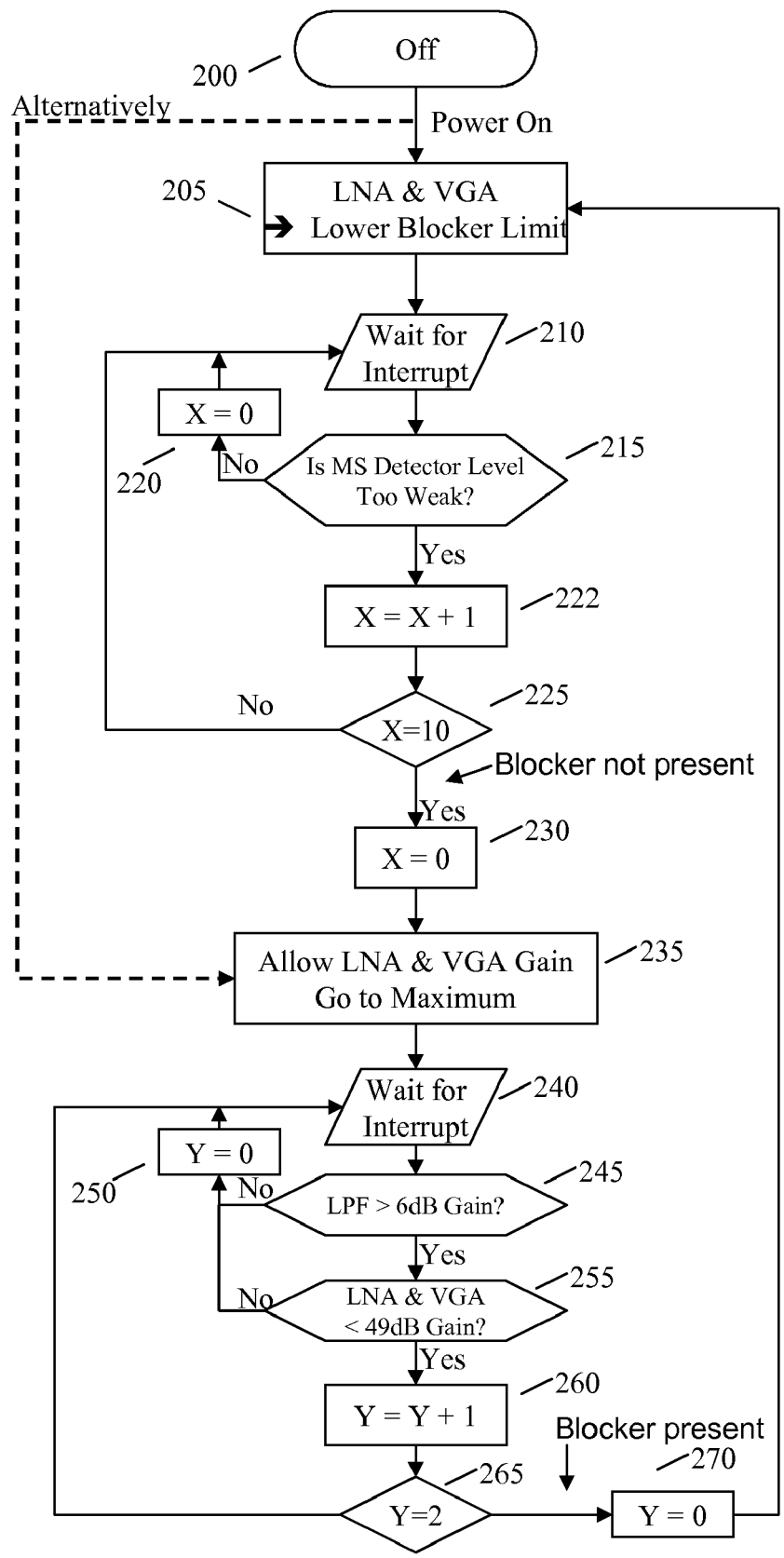
FIG. 2 shows a flow diagram of a method in accordance with an embodiment of the invention.

FIG. 2 shows a flow diagram of a method of blocker detection that enables reduction in signal distortion and saturation in accordance with an embodiment of the present invention. In step 200, the receiver comes out of power off state. Next, in 205, the maximum combined allowable gain of the LNA 105 and VGA 125 is set to a lower than maximum predetermined limit which is used during the presence of a blocker and herein called predetermined lower blocker limit. In one embodiment, the combined predetermined lower blocker limit may be 12, from a decimal range of 0 to 19, where 0 is the lowest allowable gain setting and 19 is the maximum allowable gain setting. The combined gain range of the LNA 105 and VGA 125 in dB may be between −6 dB and 51 dB with 3 dB steps. For example, −6 dB would be the 0 setting and 51 dB would be the 19 setting on the decimal range. The default value, during normal operation, may be 19, which would set the maximum combined allowable gain of the LNA 105 and VGA 125 to an upper limit. The upper limit is above the lower blocker limit and may be 51 dB. This maximum combined allowable gain to be used by the AGC 160 may be set by a register pointing to appropriate fields in a programmable lookup table. The lookup table may specify a maximum allowable gain for the LNA 105 and VGA 125 separately. By limiting the gain during power on, it is assured that there is no signal distortion and saturation in the receiver, in case of the presence of a blocker.

In steps 210 to 230, it is determined if there is no blocker present. In step 210, one waits for an interrupt signal. An interrupt may be a sampling event at a predetermined interval. The interrupt duty cycle may be programmable. For example, in one embodiment, it could have a minimum period of 310 μs and a maximum of 1.269 s. In step 215. It is determined if the MS Detector 150 level is too weak. A weak signal may be represented by an ELL 340 signal. If the MS Detector 150 signal is higher than ELL 340, as in LL 330, UL 320, or EUL 310, then a first counter 220 is set to 0, and the method continues with step 210. A weak MS Detector signal may be indicative that a blocker is not present since a strong blocker would increase the power level at the output of the VGA 125. The first counter is incremented by one in step 222. A decision is made if the first counter has reached a predefined number of times of blocker not being present. For example, in one embodiment, if the first counter has not reached 10, then the method continues with step 210. If step 225 determines that the first counter has reached 10, then the first counter is reset in step 230. The first counter provides hysteresis in order to assure that the MS Detector 215 level is stable and not fluctuating. In one embodiment, the first counter could be a programmable 6 bit counter.

Moving past step 230 is indicative that a blocker is not present. Steps 240 to 265 will check if blocker is present. In step 235, the maximum allowable gain of the combined LNA 105 and VGA 125 is increased to an upper limit. In one embodiment, this combined upper limit may be 19, from a range of 0 to 19. Step 240 waits for an interrupt. The interrupt duty cycle may be programmable and may be the same interrupt as in 210. In step 245, it is determined whether the LPF 130 gain is greater than a predetermined upper threshold. In one embodiment the predetermined upper threshold is 6 dB, which may be programmable. The range of gain for LPF 130 may be 0 dB to 24 dB with 3 dB increments. If the gain is not greater than a predetermined upper threshold, a second counter is reset to 0 and the method continues with step 240. If LPF 130 gain is greater than the predetermined upper threshold, then step 255 determines if the combined gain of the LNA 105 and the VGA 125 is less than a predetermined lower threshold. In one embodiment, the predetermined lower threshold may be programmable and set to 49 dB from the maximum of 51 dB. If not, then the second counter is reset in step 250 and the method continues with a wait for another interrupt in step 240. The combined gain tested for in the combined gain of the LNA 105 and the VGA 125 in step 255 is programmable, depending on the sensitivity required. Further, the maximum allowable gain of LNA 105 and VGA 125 may be independently programmable. For example, the LNA 105 gain may have a range in hex from 1 to 6, while the VGA may have a programmable range in hex from 1 to A. A low combined gain of the LNA 105 and the VGA 125 may be indicative that a blocker is present. A high LPF 130 gain may be indicative that the in-band desired signal is weaker than the blocker and was needed to be incremented to achieve the desired operating range. In step 260 the second counter is incremented. If the LPF 130 gain remains greater than 6 dB while the combined LNA 105 and VGA 125 gain is below 49 dB for a predetermined and programmable count of 2, step 265 leads to step 270 where the second counter is reset to 0 and the method continues at step 205 where the maximum gain allowable by the AGC 160 for the LNA 105 and VGA 125 is set to the lower lower blocker limit. Otherwise, the method continues with step 240 to wait for another interrupt. As in the first counter, the second counter adds hysteresis to assure that the determination of the presence of a blocker is stable. The order of step 245 and step 255 may be interchanged.

Although the present invention has been described with reference to particular examples and embodiments, it is understood that the present invention is not limited to those examples and embodiments. For example, in an alternate embodiment, step 235 may follow step 200. Further, gains and ranges have been provided for explanation purposes only. The present invention as claimed, therefore, includes variations from the specific examples and embodiments described herein, as will be apparent to one of skill in the art. Except to the extent necessary or inherent in the processes themselves, no particular order to steps or stages of methods or processes described in this disclosure, including the figures is implied. In many cases the order of process steps may be varied without changing the purpose, effect or import of the methods described.

What is claimed is:

1. A method for reducing signal distortion and saturation in a receiver, the method comprising:
   selectively decreasing a maximum allowable gain of a first gain stage and a second gain stage to a predetermined lower blocker limit;
   monitoring a signal power at the output of said second gain stage, and a gain of a third gain stage;
   increasing the maximum allowable gain of said first gain stage and said second gain stage to a predetermined upper limit if no blocker is detected, wherein said lower blocker limit is below said upper limit;
   detecting a blocker as being present when the gain of said third gain stage is above a predetermined programmable upper threshold and a combined gain of said first gain stage and said second gain stage is below a predetermined programmable lower threshold for a predetermined period; and selectively decreasing the maximum allowable gain of said first gain stage and said second gain stage to said lower blocker limit if the blocker is detected as present.

2. The method of claim 1, wherein said first gain stage comprises a low noise amplifier.

3. The method of claim 1, wherein said second gain stage comprises a variable gain amplifier.

4. The method of claim 1, wherein said third gain stage comprises a low pass filter.

5. The method of claim 1, wherein the maximum allowable gain for said first gain stage and said second gain stage is set to said lower blocker limit if said blocker is detected as present.

6. The method of claim 5, wherein the gain of said first gain stage and said second gain stage is set independently.

7. The method of claim 5,
detecting that the blocker is not present when a power at the output of said second gain stage is below a lower level for a predetermined duration; and
responsive to detecting that the blocker is not present, setting the maximum allowable gain for said first gain stage and said second gain stage to the upper limit.

8. The method of claim 7, wherein the allowable maximum gain for said first gain stage and said second gain stage is maintained at said upper limit if the gain of said third gain stage is not above the predetermined programmable upper threshold or the combined gain of said first gain stage and said second gain stage is not below the predetermined programmable lower threshold.

9. An RF receiver system with reduced signal distortion and saturation, the system comprising:
a first variable gain stage configured to receive external RF signals;
a second variable gain stage configured to amplify an output of said first variable gain stage mixed with an oscillator signal;
a third variable gain stage configured to filter out undesired signals and amplify desired signals;
at least one detector configured to measure a signal strength at an output of said second variable gain stage; and
an automatic gain control configured to adjust said first variable gain stage, said second variable gain stage and said third variable gain stage, and to set a maximum allowable gain of said first variable gain stage and said second variable gain stage to selectively lower the gain for said first gain stage and said second gain stage when a blocker signal is detected as present;
wherein, the blocker signal is detected as being present when the gain of said third gain stage is above a predetermined programmable upper threshold and a combined gain of said first gain stage and said second gain stage is below a predetermined programmable lower threshold for a predetermined period.

10. The system of claim 9, wherein said maximum allowable gain for said first variable gain stage and said second variable gain stage is set to a lower blocker limit if said blocker signal is detected as present.

11. The system of claim 10, wherein the gain of said first variable gain stage and said second variable gain stage are set independently.

12. The system of claim 11, wherein:
the blocker signal is detected as not being present when a power at the output of the second gain stage is below a lower level for a predetermined duration; and
responsive to a detection that the blocker signal is not present, the automatic gain control sets the maximum allowable gain for the first gain stage and the second gain stage to an upper limit.

13. The system of claim 12, wherein the allowable maximum gain for said first gain stage and second gain stage is maintained at said upper limit if the gain of said third gain stage is not above the predetermined programmable upper threshold or the combined gain of said first gain stage and second gain stage is not below the predetermined programmable lower threshold.

* * * * *